United States Patent [19]
Mong et al.

[11] Patent Number: 5,131,667
[45] Date of Patent: Jul. 21, 1992

[54] HOSE COUPLING GASKET

[75] Inventors: William K. Mong, No. Huntingdon; Daniel G. Scott, Pittsburgh, both of Pa.

[73] Assignee: Westinghouse Air Brake Company, Wilmerding, Pa.

[21] Appl. No.: 670,626

[22] Filed: Mar. 18, 1991

[51] Int. Cl.⁵ .............................................. F16J 15/10
[52] U.S. Cl. ............................... 277/169; 277/207 R; 277/207 A; 285/65; 285/99; 285/352
[58] Field of Search ............... 277/169, 171, 207 R, 277/207 A, 208, 212 F, 225; 285/63, 65–79, 80, 99, 352

[56] References Cited

U.S. PATENT DOCUMENTS

| 1,083,350 | 1/1914 | Davis . | |
|---|---|---|---|
| 1,698,192 | 1/1929 | Goodfellow et al. | 285/68 X |
| 1,765,576 | 6/1930 | Farmer | 285/68 X |
| 2,842,388 | 7/1958 | Holdeman | 277/207 R |
| 3,498,641 | 3/1970 | Bohlen | 285/352 X |
| 3,680,875 | 8/1972 | Hawthorne . | |
| 4,139,223 | 2/1979 | Clements | 285/99 |
| 4,523,778 | 6/1985 | Ebert | 285/73 |
| 4,886,303 | 12/1989 | Carson et al. | 285/99 |

FOREIGN PATENT DOCUMENTS 2207997 9/1973 Fed. Rep. of Germany ........ 285/74

Primary Examiner—William A. Cuchlinski, Jr.
Assistant Examiner—Scott W. Cummings
Attorney, Agent, or Firm—G. J. Falce

[57] ABSTRACT

An improved hose coupling gasket in which the standard gasket retaining flange is modified to include an additional sealing bead strategically formed on the upper surface of the flange such as to engage the adjacent surface of the gasket retaining groove in the coupling head. The diameter of this additional sealing bead is such that the point of engagement between the sealing bead and retaining groove corresponds to a gage point where the dimensional accuracy of the retaining groove width is checked in accordance with A.A.R. requirements.

6 Claims, 2 Drawing Sheets

HOSE COUPLING GASKET

BACKGROUND OF THE INVENTION

The present invention is related to gaskets and particularly to gaskets used in hose couplings that connect the air lines between railway cars.

Railway cars employ air brakes which require a brake pipe on each car via which pneumatic control signals may be transmitted to the respective cars when the brake pipes of adjacent cars are interconnected to form a continuous train line. Due to relative movement between the cars, a flexible hose is attached to the brake pipe at each end of the car having special couplings that join the hoses together to form the continuous train line. These hose couplings are fitted with gaskets that mate and seal with the gasket of an adjoining coupling to effect a substantially leak free connection, which is essential for proper control of the train air brakes, particularly on long trains where even minimal leakage at the numerous couplings can cause such a pressure gradient, from the front to the rear of the train, as to be intolerable.

Similar hoses and hose couplings are also provided on the various air lines on locomotives to permit coupling of these air lines between locomotives in a train-consist. Leakage at the hose couplings has been attributed primarily to mis-alignment between the gasket and the gasket retaining groove of the hose coupling. Several factors are known to influence gasket mis-alignment including torque distortion during coupling, cold temperature shrinkage of the gasket, and dimensional variations of the gasket retaining groove.

The present standard gasket approved by the A.A.R. (American Association of Railroads) is an annular, one-piece body having a radially extending, annular retaining flange that is adapted to be forced or pressed into the retaining groove of a conventional hose coupling head and an axially extending annular face portion that projects beyond the mouth of the hose coupling head and is adapted to engage the corresponding part of a companion hose coupling gasket to effect a seal therebetween. An annular, axial opening is provided in the gasket to accommodate the passage of air. On one side of the gasket retaining flange, there is formed a sealing bead that is situated in substantially axially opposed alignment with the gasket sealing face to obtain a "column" loading when the gasket is under compression during coupling, the purpose being to achieve a positive seal between the gasket and the gasket retaining groove formed in the hose coupling head. In so situating this sealing bead, however, the sealing bead lies at the very edge of the gasket retaining groove. Consequently, only slight mis-alignment between the gasket and retaining groove can cause the gasket sealing bead to become displaced relative to its intended point of engagement with the gasket retaining groove in the coupler head. Such a consequence, of course, results in loss of the gasket seal with the hose coupling head at the sealing bead, so that air is able to leak from the coupling air passage around the gasket flange and escape to atmosphere. It will be appreciated, therefore, that even though the integrity of the pressure seal is maintained at the mating faces of the adjoining hose coupling gaskets, a major source of leakage can occur via the gasket retaining groove.

SUMMARY OF THE INVENTION

The main object of the present invention is to provide a hose coupling gasket having an improved seal between the gasket retaining flange and the gasket retaining groove in the hose coupling body.

An extension of the above object is to provide an improved hose coupling gasket that is generally unaffected by typical gasket distortion, and mis-alignment.

In accordance with these objectives, there is provided a novel hose coupling gasket for use in a hose coupling that connects the air line of a railway car with an adjoining railway car air line hose coupling. The hose couplings are characterized by an annular groove or recess in the air passage for retaining the coupling gasket at the mouth of the air passage, such retaining groove having an A.A.R. specified gage point at which location the width of the retaining groove is checked for dimensional accuracy.

This novel hose coupling gasket comprises an annular body having an opening therethrough coaxial with the coupling air passage, an annular flange extending radially from one axial end of the body for engagement in the retaining groove, an annular sealing face at the opposite axial end of the body adapted to sealingly engage the counterpart sealing face of an adjoining hose coupling. a first annular sealing bead formed on one surface of the gasket flange for engagement with the retaining groove approximate the opening thereof into the coupling air passage when the flange is properly contained in the retaining groove, and a second annular sealing bead formed on the gasket flange having a diameter corresponding to the diameter of the retaining groove at the gage point thereof.

Other objects and advantages of the invention will become apparent from the following more detailed explanation when taken in connection with the accompanying drawings in which.

DESCRIPTION AND OPERATION

Figure 1:
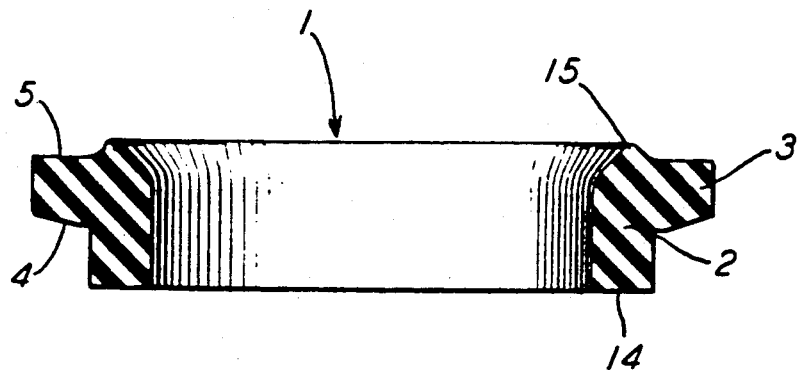
FIG. 1 is a vertical sectional view of a standard hose coupling gasket known in the prior art.

A conventional railway car hose coupling gasket 1, as shown in cross-section in FIG. 1 of the drawings, comprises an annular, one-piece body 2 that is formed of a resilient, rubber material. At one axial end of body 2 is formed an integral, radially out-turned flange 3 having a lower tapered surface 4 and an upper surface 5, the latter surface 5 being generally perpendicular to the axis of a body 2.

Figure 2:
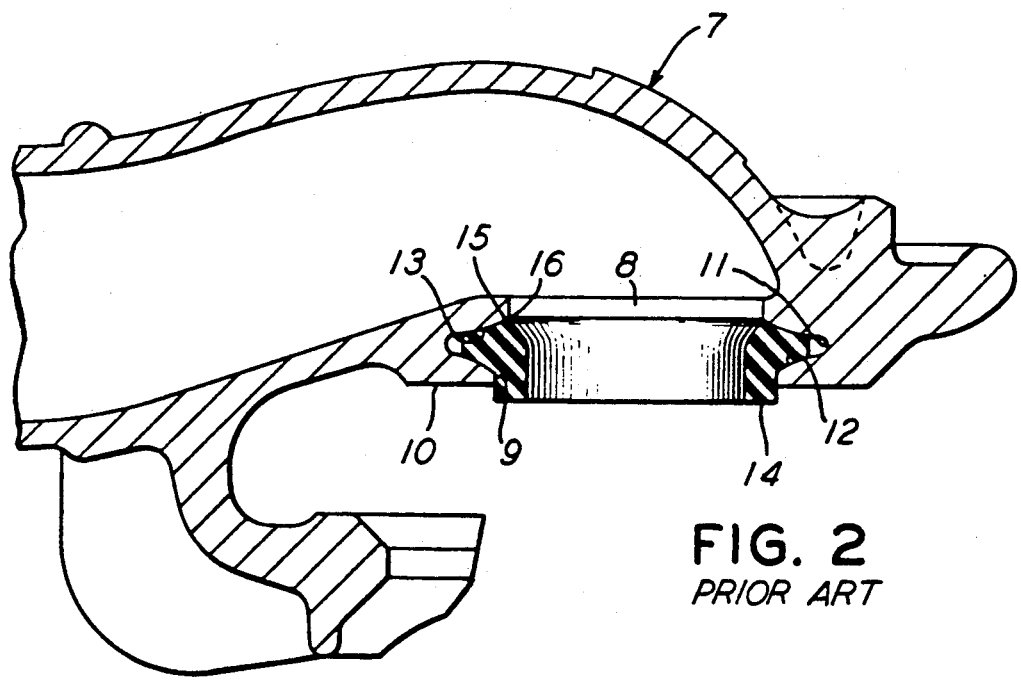
FIG. 2 is a vertical sectional view of a standard hose coupling known in the prior art showing the gasket of FIG. 1 assembled therein.

A conventional hose coupling 7, as shown in FIG. 2 of the drawings, has an air passage 8 formed in the coupling head that terminates in an opening or mouth 9 of the hose coupling mating face 10. Adjacent opening 9 is an annular gasket retaining groove 11 having a lower side 12 and an upper side 13, both of which sides are curvilinear. These curvilinear sides of groove 11 serve to facilitate assembly of gasket flange 3 in retaining groove 11, which in turn maintains gasket in its proper assembled position at mouth 9 of coupling 7.

At the other axial end of gasket body 2 is formed an annular sealing face 14 that projects beyond the hose coupling mating face 10 for sealing engagement with the sealing face of a counterpart gasket in an adjoining hose coupling. A sealing bead 15 is upraised from the upper 1 surface 5 of out-turned flange 3. The diameter of this sealing bead 15 is such as to locate the bead substantially opposite the midpoint of gasket sealing face 14, at which point it engages the upper curvilinear side 13 of retaining groove 11. In the normal course of connecting the hose coupling 7 to a mating hose coupling of similar design, it will be appreciated that the respective projecting gasket sealing faces 14 are loaded in compression to obtain a pressure seal at their interface. This compressive loading force is transmitted to the oppositely disposed sealing bead 15 to obtain a high unit load at its point of engagement with upper side 13 of groove 11. In this manner, it is intended to prevent the air in passage 8 from leaking around the gasket retaining flange 3 in groove 11, as well as at the gasket sealing faces.

It will be noted in FIG. 2 that this bead 15 normally lies very near the innermost edge 16 of groove 11, where the upper side 13 of the groove opens into the air passage 8. For this reason, gasket mis-alignment due to cold temperature shrinkage or coupling torque can result in sufficient gasket distortion as to cause bead 15 to fail to engage the upper side 13 of groove 11.

Figure 3:
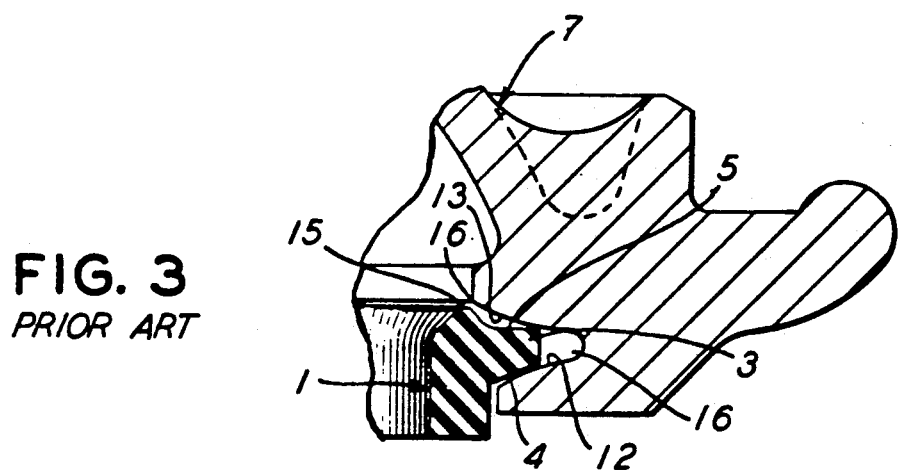
FIGS. 3 and 4 are partial enlarged views of FIG. 2 illustrating different conditions of gasket mis-alignment in which leakage can occur in a coupling employing the gasket of FIG. 1.

In FIG. 3 of the drawings, for example, one such condition of gasket mis-alignment is shown, due to gasket distortion resulting from either cold temperature shrinkage or coupling torque. It can be seen that not only is bead 15 out of engagement with upper side 13 of groove 11, but also less area of surfaces 4 and 5 of the gasket retaining flange 3 is in contact with the lower side 12 and upper side 13, respectively, of groove 11. It will be appreciated, therefore, that pressurized air can leak past bead 15 and the interface between surface 5 of flange 3 and adjacent side 13 of groove 11 to a pocket 16 formed in groove 11 at the outer end of gasket flange 3. The pressure of this air effective in pocket 16 acting on the end of gasket flange 3 acts to further acerbate the shifting of gasket 1 laterally inwardly, thereby further reducing the sealing effect between the gasket flange 3 and retaining groove 11. Accordingly, the air in pocket 16 is able to force its way past the interface of curvilinear surface 4 of flange 3 and side 12 of groove 11 to atmosphere, thereby completing a leakage path from air passage 8 around the gasket retaining flange 3.

Figure 4:
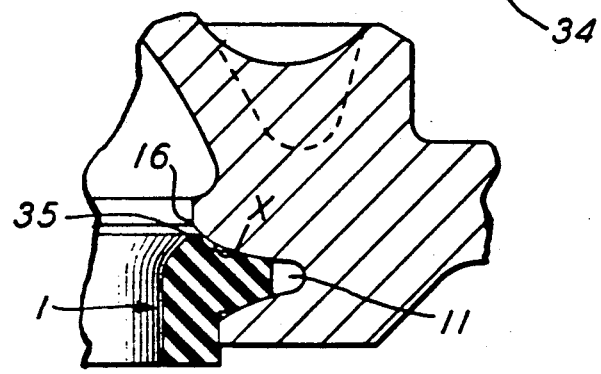

In FIG. 4 of the drawings is shown another condition of gasket mis-alignment resulting from inaccurate machining of gasket groove 11. In attempting to better control dimensional variations of the gasket groove, the A.A.R. has specified a gaging point X at a predetermined location of the gasket groove, at which point the groove size is checked by a go/no go gaging tool. This gaging point X exists at a radial diameter of groove 11 of 1.499 in. While such practice assures uniformity of the groove size at the gage point, other groove dimensions can still deviate from the size specified, so that gasket misalignment resulting from dimensional variations of the gasket groove, as well as from coupling torque and cold temperature shrinkage. is still possible.

Figure 5:
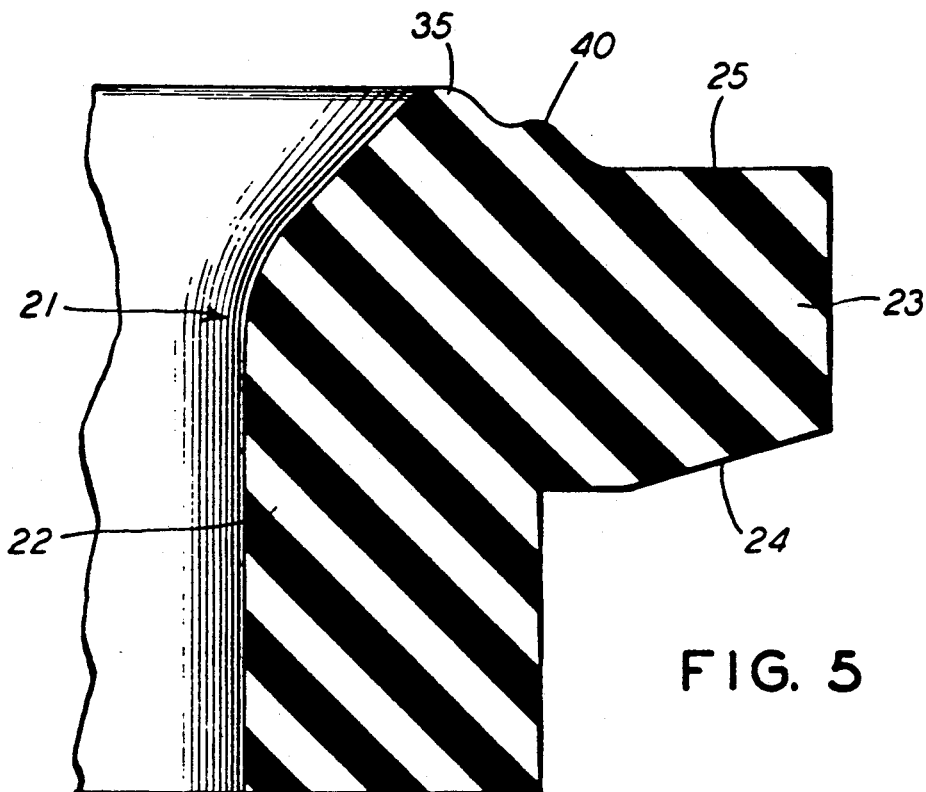
FIG. 5 is a vertical sectional view of a novel hose coupling gasket according to the present invention.

In accordance with the present invention, there is shown in FIG. 5 an improved hose coupling gasket 21 comprising an annular, one-piece body 22 that is formed of a resilient, rubber material. At one axial end of body 22 is formed an integral, radially out-turned flange 23 having a lower tapered surface 24 and an upper surface 25, the latter surface 25 being generally perpendicular to the axis of a body 22.

At the other axial end of body 22, there is formed an annular sealing face 34 that projects, when installed in a hose coupling 7, beyond the hose coupling mating face 10 for sealing engagement with the sealing face of a counterpart gasket in an adjoining hose coupling. An annular sealing bead 35 is upraised from the upper surface 25 of out-turned flange 23. The diameter of this sealing bead 35 is such as to locate the bead substantially opposite the midpoint of gasket sealing face 34, so that when installed in a hose coupling 7, bead 35 engages surface 13 of groove 11 approximate innermost edge 16. In the normal course of connecting hose coupling 7 to a mating hose coupling of similar design, it will be appreciated that the respective projecting gasket sealing faces 34 are loaded in compression to obtain a pressure seal at their interface. This compressive loading force is transmitted to the oppositely disposed sealing bead 35 to obtain a high unit load at its point of engagement with upper side 13 of groove 11.

Also upraised from surface 25 of flange 23 is another annular sealing bead 40 that is disposed at a specific location adjacent sealing bead 35. In accordance with the present invention, the circumference of this seal bead 40 corresponds to the predetermined gage point X at which the gasket groove is checked for dimensional accuracy. Since the gasket groove is accurately held within tolerances at this gaging diameter, the apex of bead 40 can be upraised a precise distance above surface 25 of flange 23, as necessary to obtain a compressive load force at bead 40 sufficient to maintain an effective seal between bead 40 and groove 11, even when gasket distortion causes flange 23 and thus bead 40 to shift slightly inwardly in groove 11. For this purpose, the apex of bead 40 is upraised from surface 25 of flange 23 a distance of 0.0275 in. In addition, the apex of bead 35 is also upraised from the surface 25 of flange 23 a distance sufficient to achieve a pressure seal therebetween, this distance being greater than the distance bead 40 is upraised, due to the fact that the width of groove 11 is greater at its opening into air passage 8 than at the groove gage point.

Figure 6:
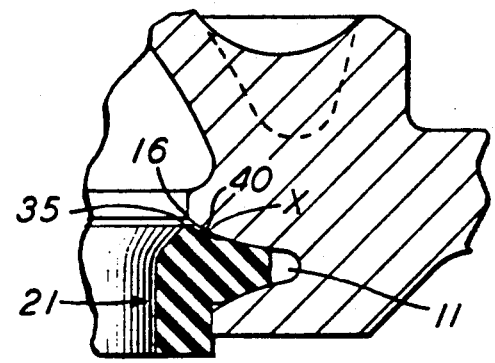
FIGS. 6 and 7 are partial enlarged views of a hose coupling illustrating how the novel gasket of FIG. 5 maintains a pressure seal at the gasket retaining flange in the event of gasket mis-alignment resulting from distortion and/or inaccurate machining of the gasket retaining groove.

Under normal conditions, bead 40 serves as a backup to sealing bead 35. In the event bead 35 fails to engage its sealing point approximate the innermost edge 16 of groove 11, however, due for example to machining inaccuracies causing the groove width at the point of engagement with bead 35 to be too large, as shown in FIG. 6, a pressure seal will still be obtained by reason of seal bead 40 having engagement with groove 11 precisely at the groove gaging point X where the groove dimension is assured of being accurate. It will be appreciated, therefore, that gasket 21, in accordance with the present invention, serves to eliminate a major source of air leakage caused by inaccurate machining of gasket retaining groove 11.

Figure 7:
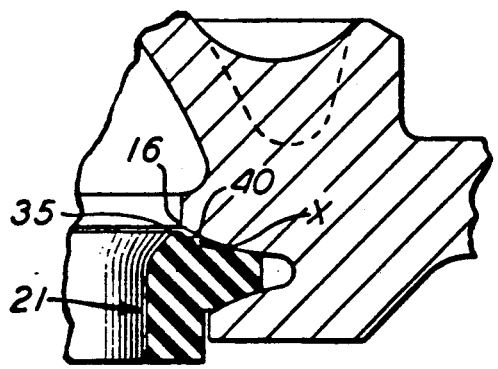

Another condition that adversely affects the pressure seal provided by seal bead 35 is that of gasket distortion, such as causes lateral inward shifting of flange 35, due for example to cold temperature shrinkage and coupling torque at the gasket sealing face. While even slight lateral inward shifting of flange 23 is sufficient to cause bead 35 to slip out of groove 11, due to its normal sealing location being at the very edge of groove 11 approximate air passage 8, as shown in FIG. 7, seal bead 40 remains within a sealing area of groove 11, even though bead 40 may also be displaced laterally inwardly from its normal position at the groove gage point X. This sealing area of groove 11 is dictated by the variable width of groove 11, due to the groove sides 12, 13 being curvilinear, and the degree of compression under which bead 40 is normally placed in order to allow sufficient expansion to maintain bead engagement with groove 11 at the point of increased groove width.

In that only relatively slight inward displacement of gasket flange 23 occurs due to cold temperature shrinkage and coupling torque, the aforementioned 0.0275 in. height of bead 40 above surface 25 of gasket flange 23 assures sealing engagement of bead 40 with groove 11 in the face of such gasket distortion.

It will be appreciated therefore, that in providing a sealing bead 40, in addition to the present sealing bead 35, at a location corresponding to the gage point at which the A.A.R. specified gaging tool measures the width of the gasket retaining groove, leakage of compressed air from the trainline around the gasket retaining flange 23, due to inaccurate machining of the gasket retaining groove or due to typical gasket distortion, is eliminated.

I claim:

1. In a hose coupling for a railway car air line having a gasket retaining groove formed coaxially with, and opening into the coupling air passage at a location adjacent the mouth of said coupling, said groove having at least one curvilinear surface including a fixed gage point at which the axial dimension of said groove is measured for accuracy, there is provided a one-piece, annular, resilient elastomeric gasket comprising:

(a) an annular body having an opening therethrough coaxial with said air passage;
(b) an annular flange extending radially from one axial end of said body, said flange being contained in said retaining groove to secure said gasket at the mouth of said air passage;
(c) an annular sealing face at the opposite axial end of said body adapted to sealingly engage the counterpart sealing face of an adjoining hose coupling;
(d) a first annular sealing bead formed on the side of said flange adjoining said curvilinear surface of said retaining groove, said first sealing bead engaging said retaining groove approximate the opening thereof into said air passage when said flange is properly contained in said retaining groove; and
(e) a second annular sealing bead formed on the side of said flange, on which said first sealing bead is formed, said second sealing bead having a diameter of 1.499 in. corresponding to the radial diameter of said groove at said gage point.

2. A hose coupling gasket, as recited in claim 1, wherein the diameter of said first sealing bead is less than the diameter of said second sealing bead.

3. A hose coupling gasket, as recited in claim 2, wherein said first and second sealing beads are upraised from said one side of said flange.

4. A hose coupling gasket, as recited in claim 3, wherein the apex of said second sealing bead is upraised from said one side of said flange a distance sufficient to maintain engagement thereof with said at lease one side of said groove under compression when distortion of said gasket shifts said second sealing bead laterally out of alignment with said gage point.

5. A hose coupling gasket, as recited in claim 4, wherein the distance the apex of said second seal bead is upraised from said one side of said flange is 0.0275 in.

6. A hose coupling gasket, as recited in claim 4, wherein the distance the apex of said first seal bead is upraised from said one side of said flange is greater than 0.0275 in.

* * * * *